United States Patent
Campbell et al.

(10) Patent No.: US 11,337,579 B2
(45) Date of Patent: May 24, 2022

(54) DOMESTIC DISHWASHER AND DISHWASHING METHOD

(71) Applicant: Reckitt Benckiser (Brands) Limited, Slough (GB)

(72) Inventors: Stuart Campbell, Heidelberg (DE); Frank Dierkes, Heidelberg (DE); Karl-Heinz Mohrhard, Heidelberg (DE); Caroline Rigobert, Hertogenbosch (NL); Boris Seitz, Heidelberg (DE); Dietmar Van Loyen, Heidelberg (DE)

(73) Assignee: RECKITT BENCKISER (BRANDS) LIMITED, Slough (GB)

(*) Notice: Subject to any disclaimer, the term of this patent is extended or adjusted under 35 U.S.C. 154(b) by 0 days.

(21) Appl. No.: 15/567,357

(22) PCT Filed: Apr. 29, 2016

(86) PCT No.: PCT/GB2016/051264
§ 371 (c)(1),
(2) Date: Oct. 17, 2017

(87) PCT Pub. No.: WO2016/174480
PCT Pub. Date: Nov. 3, 2016

(65) Prior Publication Data
US 2018/0103822 A1    Apr. 19, 2018

(30) Foreign Application Priority Data
Apr. 29, 2015    (GB) ................................ 1507289

(51) Int. Cl.
*A47L 15/00* (2006.01)
*B08B 3/02* (2006.01)
(Continued)

(52) U.S. Cl.
CPC ....... *A47L 15/0028* (2013.01); *A47L 15/0007* (2013.01); *A47L 15/0047* (2013.01);
(Continued)

(58) Field of Classification Search
None
See application file for complete search history.

(56) References Cited

U.S. PATENT DOCUMENTS 8,268,768 B2    9/2012  Sendor-Muller et al.
8,920,576 B2 *  12/2014 Gentschev ........... C11D 7/3209
                                                      134/25.2

(Continued)

FOREIGN PATENT DOCUMENTS

EP    0282214 A1    9/1988
EP    0487474 A1    5/1992
(Continued)

OTHER PUBLICATIONS

International Search Report and Written Opinion issued in related International Patent Application No. PCT/GB2016/051264 dated Jul. 18, 2016.

*Primary Examiner* — Eric W Golightly
*Assistant Examiner* — Arlyn I Rivera-Cordero
(74) *Attorney, Agent, or Firm* — Troutman Pepper Hamilton Sanders LLP; Ryan A. Schneider; Chris N. Davis

(57) ABSTRACT

The invention relates to a method of automatic dishwashing in a dishwasher having a wash tank, comprising: in a first step, delivering a first composition to dishware in the tank in the form of a mist; and afterwards, in a second step, delivering a second composition to the dishware in the tank in the form of a jet; wherein the first and second compositions are different, the first composition comprises a bleach, and the second composition is alkaline and comprises a builder. The invention also provides a dishwasher adapted to carry out the inventive method.

11 Claims, 1 Drawing Sheet

(51) Int. Cl.
  *B08B 3/08* (2006.01)
  *C11D 3/08* (2006.01)
  *C11D 3/33* (2006.01)
  *C11D 3/36* (2006.01)
  *C11D 3/39* (2006.01)
  *C11D 11/00* (2006.01)
  *C11D 3/395* (2006.01)

(52) U.S. Cl.
  CPC .......... *A47L 15/0055* (2013.01); *B08B 3/024* (2013.01); *B08B 3/08* (2013.01); *C11D 3/08* (2013.01); *C11D 3/33* (2013.01); *C11D 3/361* (2013.01); *C11D 3/3905* (2013.01); *C11D 3/3942* (2013.01); *C11D 3/3956* (2013.01); *C11D 11/0023* (2013.01); *C11D 11/0064* (2013.01); *A47L 2401/03* (2013.01); *A47L 2401/10* (2013.01); *A47L 2501/07* (2013.01); *A47L 2501/30* (2013.01); *B08B 2203/007* (2013.01)

(56) References Cited

U.S. PATENT DOCUMENTS

| | | |
|---|---|---|
| 2005/0224098 A1 | 10/2005 | Fujii et al. |
| 2006/0266381 A1* | 11/2006 | Doherty .............. A47L 15/0065 134/25.2 |
| 2010/0071725 A1* | 3/2010 | Peukert ............... A47L 15/0055 134/25.2 |
| 2010/0089421 A1 | 4/2010 | Elick et al. |
| 2010/0089425 A1* | 4/2010 | Classen ............... A47L 15/4436 134/25.2 |
| 2010/0108102 A1 | 5/2010 | Kehl et al. |
| 2010/0163076 A1* | 7/2010 | Zipfel ...................... C11D 3/39 134/25.2 |
| 2012/0088710 A1 | 4/2012 | Kessler et al. |
| 2012/0180820 A1* | 7/2012 | Hong .................... A47L 15/245 134/25.2 |
| 2014/0251385 A1* | 9/2014 | Kelly-Murray ..... A47L 15/0076 134/25.2 |
| 2015/0075568 A1* | 3/2015 | Skop ....................... A47L 15/44 134/25.2 |
| 2015/0101639 A1* | 4/2015 | Heppner .............. A47L 15/0026 134/18 |
| 2015/0201823 A1* | 7/2015 | Poojary ............... A47L 15/4219 134/172 |

FOREIGN PATENT DOCUMENTS

| | | |
|---|---|---|
| EP | 0808894 A1 | 11/1997 |
| EP | 1586263 A2 | 10/2005 |
| EP | 2201883 A1 | 6/2010 |
| WO | 9616152 A1 | 5/1996 |
| WO | 2010/069905 A1 | 6/2010 |
| WO | 2010/149695 A1 | 12/2010 |
| WO | WO-2013160661 A1 * | 10/2013 ......... A47L 15/0007 |

* cited by examiner

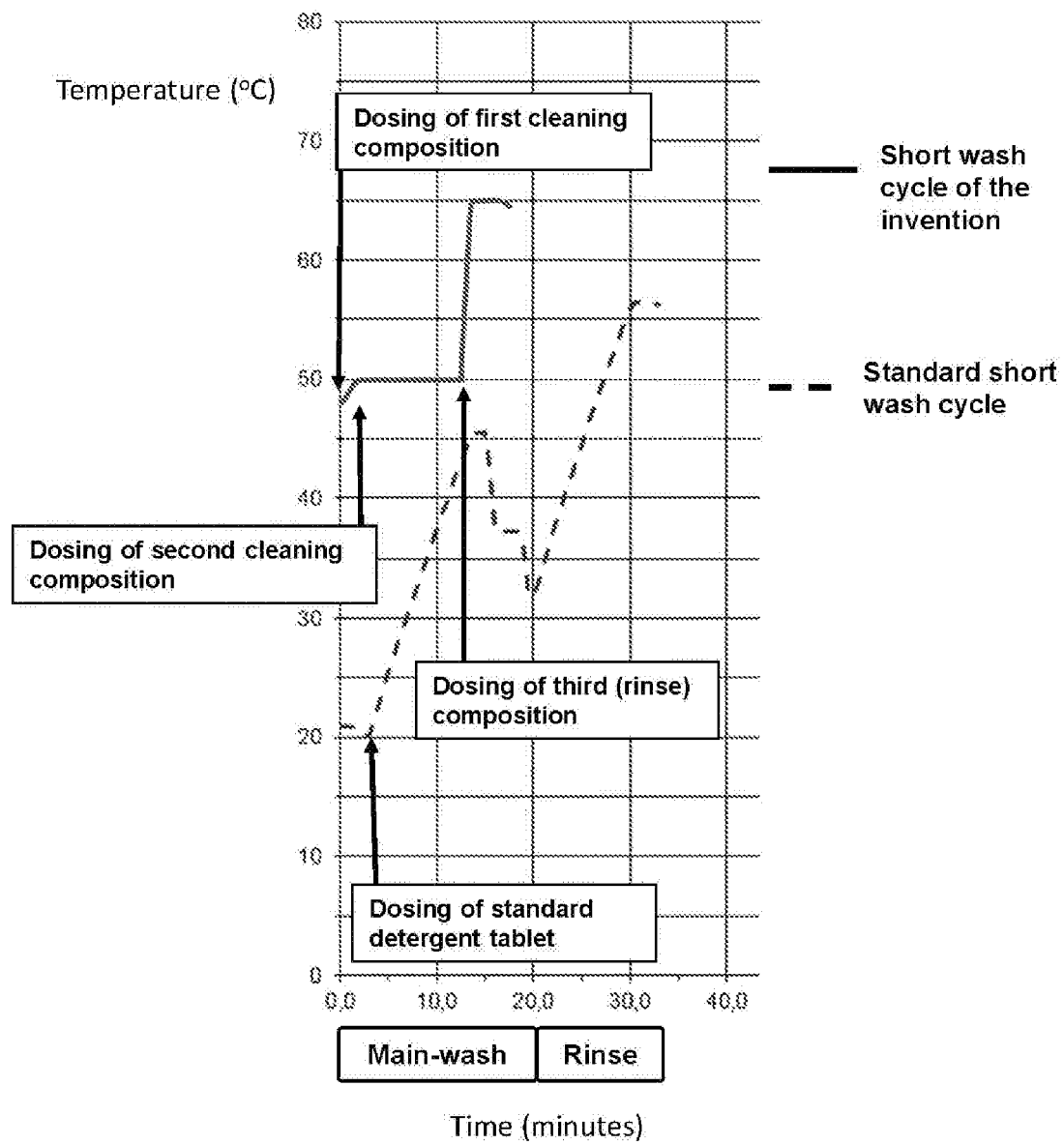

DOMESTIC DISHWASHER AND DISHWASHING METHOD

CROSS-REFERENCE TO RELATED APPLICATIONS

This application is a national stage entry of, and claims priority to, PCT/GB2016/051264 filed 29 Apr. 2016, which claims priority to GB Patent Application No. 1507289.5 filed 29 Apr. 2015, the disclosures of both of which are herein incorporated by reference in their entireties.

TECHNICAL FIELD

The invention relates to domestic dishwashing, especially by a method which outperforms the current so-called "quick wash" programmes.

BACKGROUND

Automatic dishwashing machines have been present in homes and commercial premises for decades. They offer genuine benefits in terms of speed of cleaning, consistency of cleaning and convenience with respect to manual dishwashing.

Automatic dishwashing machines are used in both the domestic and commercial/institutional markets, but are designed very differently depending on the intended market. Industrial/institutional markets demand higher size and/or volume of throughput, so their machines often have much shorter but more energy intensive (e.g. higher temperature and/or greater mechanical action) cycles compared to domestic machines. Non-domestic machines can be based on a conveyor system in which dishware is moved through a single or multiple tanks of the dishwasher, whereas in modern domestic machines the dishware will generally always remain stationary in one tank inside the dishwasher, and all the washing steps will occur in that single tank.

Non-domestic dishwashers also tend to be designed to use much more aggressive chemistry (e.g. very highly alkaline detergent). Typically, they will not use enzymes, because these need a certain contact time (at financially viable loading levels) with the treated soils to perform effectively, and the commercial cycle time is too short. In contrast, in domestic dishwashing, proteases and amylases have been described as absolutely indispensable ingredients in modern formulations (*Enzymes in Industry*, 3rd Edition, 2007, Chapter 5.2.2).

There is a constant drive to make consumer appliances more and more environmentally friendly, which for dishwashers means improving energy efficiency through development of lower temperature cycles, and reducing water use. Clearly, this needs to be balanced with achieving an acceptable cleaning performance, and there is only so far the reductions can go with current technologies. Redeposition of soil (when stains are initially lifted from the surface of the dishware but then carried by the wash water and deposited back onto other items) is a particular problem in the art when the volume of wash water gets too low, because it is more difficult to keep the soils suspended in a more concentrated system.

As well as making the machines more environmentally friendly overall, current dishwashers have a range of different programmes for the consumer to select between for each wash. These range from very hot cycles for maximum cleaning, which typically last over an hour, to even longer "Eco" cycles for washing with the minimum energy requirements. Though the cleaning performance of such cycles may be considered adequate, the modern consumer is dissatisfied with waiting this length of time to obtain clean dishes.

Some dishwashers are available today which have a shorter wash programme as one of their options, but these cycles are only designed to clean lightly soiled dishware. For example, the Miele G698 SC Plus machine has a "Short 45° C." programme for lightly soiled crockery, which has no prewash or drying stage and lasts only 32 minutes. However, this still consumes 13-14 litres of water per complete wash. The machines with the most water-efficient cycles (around 6 litres) tend to be the longer-lasting "Eco" cycles.

It would be desirable to have a very short wash programme with improved cleaning performance that allows action on tougher soils, but still offers reduced water consumption, and which does not need to use harsher or more costly detergents. Ideally the energy consumption would also be reduced.

In response, the present inventors have created a very short but effective domestic dishwashing method, which does not need to use enzymes at all, and which outperforms the current "quick wash" programmes. This involves delivering a bleach-containing composition as a mist and a second alkaline composition comprising builder as a jet.

WO2013/160661 (RB) discloses a method of automatic dishwashing comprising contacting soiled wares with a detergent mist, atomized to a size wherein >95% of the particles have a diameter less than 2 microns. A single mist source nozzle can be used and the smaller particles are said to fill the dishwasher more rapidly, behaving in a gas-like way and reaching the surface of items which do not have a "line of sight" from the nozzle. The small particles apparently penetrate into the food soils more effectively. In this document, whilst a rinse aid may be delivered separately after the main wash, there is no sequential dosing of different detergent ingredients during the main wash, and no teaching to use different delivery mechanisms for different compositions during the cycle.

Similarly, EP1586263 (Panasonic) discloses using a mist for a first cleaning step which allows detergent to permeate into the soils, followed by a second cleaning step to remove the soils from the surface. The mist is atomized in the order of microns, and may be created by an ultrasonic vibrator, or by a spray nozzle positioned perpendicular to an air jet nozzle. The use of different detergent ingredients in the two steps is not disclosed.

EP0487474 (Electrolux) suggests using ultrasound or aerosol methods to create a "cold" liquid fog of a composition comprising surfactant or enzymes, which condenses on the plates. The droplet diameter is controlled in the range 0.5-25 microns. A conventional spray arm is also present in the machine.

SUMMARY OF THE INVENTION

The present inventors have now found that, whilst delivering the whole detergent composition as a mist does reduce water consumption, performance is sub-optimal compared with using the traditional spray mechanism, because for certain types of soils, the mechanical action of the water is very important for cleaning. Specifically, cleaning of some soils benefits from the mechanical action of the water, whereas bleachable soils can be removed without needing a high spray force. It has consequently been discovered that it is possible to reduce water consumption and improve performance in the context of a short cycle, by delivering different cleaning compositions in different types of spray mechanism which are tailored to the respective detergent ingredient.

According to a first aspect of the invention, there is provided a method of automatic dishwashing in a dishwasher having a wash tank comprising: in a first step, delivering a first composition to dishware in the wash tank in the form of a mist; and afterwards, in a second step, delivering a second composition to the dishware in the wash tank in the form of a jet; wherein the first and second compositions are different; wherein the first composition comprises a bleach; and wherein the second composition is alkaline and comprises a builder.

According to a second aspect of the invention, there is provided an automatic dishwasher configured to carry out any of the methods of automatic dishwashing disclosed herein.

DESCRIPTION OF THE FIGURES

FIG. 1 illustrates the temperature profile of the "Short 45° C." programme of the Miele G698 SC Plus dishwasher, together with the profile of a wash programme according to an embodiment of the present invention, and the points at which the detergents are dosed.

DETAILED DESCRIPTION

Unless specifically stated or the context otherwise requires, embodiments described herein apply equally to all aspects of the invention. Percentages quoted are by weight, unless otherwise stated or the context otherwise requires.

The invention involves a dishwasher having a wash tank, and particularly applies to dishwashers having a single tank and/or non-conveyor type machines, in which the machine does not transport the dishware through a wash zone. In the case where multiple tanks are present, the first and second compositions are delivered to the same dishware in the same tank.

According to the present invention, the first composition is delivered as a mist, and the second composition is delivered as a jet. Delivering each composition in this matter produces effective cleaning in a short period of time. As described herein, the second composition is aided by the mechanical action of delivery, while the first composition is not. By delivering the two compositions in this manner, the volume of water required may be reduced. In particular, much less water is required to deliver the first composition as a fine mist than using traditional spray arms. In addition, there are benefits to delivering the bleach composition as a mist as this ensures a more even distribution throughout the whole of the dishwasher interior.

The jet and mist relationship may be defined by a number of means. In an embodiment, the first composition is delivered at a lower momentum than the second composition. In an embodiment, the first composition is delivered with a lower mass flow rate than the second composition. In an embodiment, the density of the plume of the first composition is lower than the density of the jet of the second composition. The plume of the jet and the mist immediately after the nozzle may be considered, and the density of the mist will be lower than the density of the jet. In particular, these comparisons may result in a ratio for each parameter of at least 2:1 but preferably 3:1 between the mist and the jet.

In certain embodiments, the ratio of momentum or mass flow rate or density between the first and second compositions is at least 1:2, preferably it is at least 1:3.

Preferably, the first composition is delivered with a mean particle size of 5 to 500 microns. Preferably 50% of the particles having a diameter of less than 60 microns.

The mist particle size may typically be
DV(10)=35 microns
DV(50)=50 microns
DV(90)=120 microns
(Where DV(X)=X % of the particles are smaller than this value)

The main steps of the method are the first step which delivers bleach, the second step which delivers builder, and the optional third and fourth rinse steps. Additional steps may be present in the method, for example a pre-rinse step occurring before the first step, or a further cleaning step after the second step. In the interests of keeping the method as short as possible, however, there are preferably no additional cleaning or rinsing steps in the method.

In an embodiment, an active drying step is used at the end of the method, for instance involving active heating. In another embodiment, there is no active drying step in the method. The dishwasher can terminate the programme after the last cleaning/rinse stage and the consumer can simply open the door of the machine to allow water vapour to escape and the wares dry naturally. This is comparable with today's "quick wash" programmes which typically also have wet wares at the end of the programme.

The first composition comprises a bleach. This may be a chlorine bleach or an oxygen bleach, but is preferably an oxygen bleach. This may be, for example, hydrogen peroxide or a hydrogen peroxide precursor.

Most preferably the bleach is selected from inorganic peroxy-compounds and organic peracids and the salts derived therefrom.

Examples of inorganic perhydrates include persulfates such as peroxymonopersulfate (KMPS), perborates or percarbonates. The inorganic perhydrates are normally alkali metal salts, such as lithium, sodium or potassium salts, in particular sodium salts. The inorganic perhydrates may be present in the detergent as crystalline solids without further protection. For certain perhydrates, it is however advantageous to use them as granular compositions provided with a coating which gives the granular products a longer shelf life.

The preferred percarbonate is sodium percarbonate of the formula $2Na_2CO_3 \cdot 3H_2O_2$. A percarbonate, when present, is preferably used in a coated form to increase its stability.

Organic peracids include all organic peracids traditionally used as bleaches, including, for example, perbenzoic acid and peroxycarboxylic acids such as mono or diperoxyphthalic acid, 2-octyldiperoxysuccinic acid, diperoxydodecanedicarboxylic acid, diperoxy-azelaic acid and imidoperoxycarboxylic acid and, optionally, the salts thereof. Especially preferred is phthalimidoperhexanoic acid (PAP).

The bleaching compound may also be a chlorine based bleach compound or precursor such as sodium or calcium hypochlorite.

In an embodiment, the first composition further comprises a bleach activator and/or a bleach catalyst.

By "bleach activator", it is meant herein a compound which reacts with peroxygen bleach like hydrogen peroxide to form a peracid. The peracid thus formed constitutes the activated bleach. Suitable bleach activators to be used herein include those belonging to the class of esters, amides, imides, or anhydrides. Examples of suitable compounds of this type are disclosed in British Patent GB 1 586 769 and GB 2 143 231 and a method for their formation into a prilled form is described in European Published Patent Application EP-A-62 523.

Suitable examples of such compounds to be used herein are tetracetyl ethylene diamine (TAED), sodium 3,5,5 trimethyl hexanoyloxybenzene sulphonate, diperoxy dodecanoic acid as described for instance in U.S. Pat. No. 4,818,425 and nonylamide of peroxyadipic acid as described for instance in U.S. Pat. No. 4,259,201 and n-nonanoyloxybenzenesulphonate (NOBS). Also suitable are N-acyl caprolactams selected from the group consisting of substituted or unsubstituted benzoyl caprolactam, octanoyl caprolactam, nonanoyl caprolactam, hexanoyl caprolactam, decanoyl caprolactam, undecenoyl caprolactam, formyl caprolactam, acetyl caprolactam, propanoyl caprolactam, butanoyl caprolactam pentanoyl caprolactam or mixtures thereof. A particular family of bleach activators of interest was disclosed in EP 624 154, and particularly preferred in that family is acetyl triethyl citrate (ATC). Acetyl triethyl citrate has the advantage that it is environmental-friendly as it eventually degrades into citric acid and alcohol. Furthermore, acetyl triethyl citrate has a good hydrolytical stability in the product upon storage and it is an efficient bleach activator. Finally, it provides good building capacity to the composition.

Any suitable bleach catalyst may be used for example manganese acetate or dinuclear manganese complexes such as those described in EP-A-1,741,774. The organic peracids such as perbenzoic acid and peroxycarboxylic acids e.g. PAP do not require the use of a bleach activator or catalyst as these bleaches are active at relatively low temperatures such as about 30° C. and this contributes to such bleach materials being especially preferred according to the present invention.

The second composition is alkaline and comprises a builder. Preferably it has a pH greater than 7.5, preferably greater than 8, preferably greater than 9. Preferably the pH is less than 13, preferably less than 12, preferably less than 11.

In an embodiment, the second composition is bleach-free.

The builder may be either a phosphate builder or a phosphate-free builder, but is preferably phosphate-free. Preferably it is chosen from amino acid based compounds and/or succinate based compounds. The terms 'succinate based compound' and 'succinic acid based compound' are used interchangeably herein. Conventional amounts of the amino acid based compound and/or succinate based compound may be used per composition of the present method. Preferred examples of amino acid based compounds which may be used are MGDA (methyl-glycine-diacetic acid, and salts and derivatives thereof) and GLDA (glutamic-N,N-diacetic acid and salts and derivatives thereof).

Other suitable builders are described in U.S. Pat. No. 6,426,229 which are incorporated by reference herein. Particular suitable builders include; for example, aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl) aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), α-alanine-N,N-diacetic acid (α-ALDA), β-alanine-N,N-diacetic acid (β-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N, N-diacetic acid (TUDA) and sulfomethyl-N,N-diacetic acid (SMDA) and alkali metal salts or ammonium salts thereof.

Further preferred succinate compounds are described in U.S. Pat. No. 5,977,053 and have the formula;

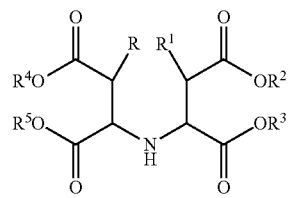

in which R, R¹, independently of one another, denote H or OH, $R^2$, $R^3$, $R^4$, $R^5$, independently of one another, denote a cation, hydrogen, alkali metal ions and ammonium ions, ammonium ions having the general formula $R^6R^7R^8R^9N^+$ and $R^6$, $R^7$, $R^8$, $R^9$, independently of one another, denoting hydrogen, alkyl radicals having 1 to 12 C atoms or hydroxyl-substituted alkyl radicals having 2 to 3 C atoms.

Preferred examples include tetrasodium imminosuccinate. Iminodisuccinic acid (IDS) and (hydroxy)-iminodisuccinic acid (HIDS) and alkali metal salts or ammonium salts thereof are especially preferred succinate based builder salts.

It is especially preferred according to the present invention that the builder comprises methyl-glycine-diacetic acid, glutamic-N,N-diacetic acid, tetrasodium imminosuccinate, or (hydroxy)-iminodisuccinic acid and salts or derivatives thereof.

Another preferred builder is 2-(1-Carboxy-ethoxy)-2-methyl-malonic acid.

Other builders include non-polymeric organic molecules with carboxylic group(s). Builder compounds which are organic molecules containing carboxylic groups include citric acid, fumaric acid, tartaric acid, maleic acid, lactic acid and salts thereof. In particular the alkali or alkaline earth metal salts of these organic compounds may be used, and especially the sodium salts. An especially preferred phosphorous-free builder is sodium citrate. Such polycarboxylates which comprise two carboxyl groups include, for example, water-soluble salts of, malonic acid, (ethylenedioxy)diacetic acid, maleic acid, diglycolic acid, tartaric acid, tartronic acid and fumaric acid. Such polycarboxylates which contain three carboxyl groups include, for example, water-soluble citrate. Correspondingly, a suitable hydroxycarboxylic acid is, for example, citric acid.

Further builders include homopolymers and copolymers of polycarboxylic acids and their partially or completely neutralized salts, monomeric polycarboxylic acids and hydroxycarboxylic acids and their salts, phosphates and phosphonates, and mixtures of such substances. Preferred salts of the abovementioned compounds are the ammonium and/or alkali metal salts, i.e. the lithium, sodium, and potassium salts, and particularly preferred salts is the sodium salts. Secondary builders which are organic are preferred. A polymeric polycarboxylic acid is the homopolymer of acrylic acid. Other suitable secondary builders are disclosed in WO 95/01416, to the contents of which express reference is hereby made.

Useful chelating agents are preferably selected from 1-hydroxyethylidene-1,1-diphosphonic acid (HEDP), ethylenediamine disuccinic acid (EDDS), ethylenediaminetetraacetic acid (EDTA), diethylenetriaminepentaacetic acid (DTPA), diethylenetriaminepentamethylene phosphonic acid (DTPMPA), nitrilotriacetic acid (NTA), aspartic acid diethoxysuccinic acid (AES), aspartic acid-N,N-diacetic acid (ASDA), ethylenediamine tetra methylene phosphonic acid (EDTMP), iminodifumaric (IDF), iminoditartaric acid (IDT), iminodimaleic acid (IDMAL), iminodimalic acid (IDM), ethylene-diaminedifumaric acid (EDDF), ethylene-diaminedimalic acid (EDDM), ethylene-diamineditartaric acid (EDDT), ethylenediaminedimaleic acid and (EDDMAL), amino-tri(methylenephosphonic acid) (ATMP); and salts and mixtures thereof.

Where any chelating agent described herein is present as a salt it may be present as a metal salt, for example an alkali metal salt, or it may be present as an ammonium or quaternary ammonium salt. Suitable metal salts include salts or potassium, sodium, boron, magnesium, zinc or a mixture thereof. Especially preferred are sodium salts. Suitable ammonium salts include salts of ammonia and ethanolamine.

Preferably the total amount of builder present is an amount of at least 20 wt %, and most preferably at least 25 wt %, preferably in an amount of up to 70 wt %, preferably up to 65 wt %, more preferably up to 60 wt % of the compositions. The actual amount used in the compositions will depend upon the nature of the builder used.

Other conventional ingredients may be included in either composition as appropriate, such as polymer, co-builder, surfactant, dye, fragrance, anti-foam, preservative, material care/anti-corrosion ingredient.

Anti-corrosion agents may provide benefits against corrosion of glass and/or metal and the term encompasses agents that are intended to prevent or reduce the tarnishing of non-ferrous metals, in particular of silver and copper.

It is known to include a source of multivalent ions in detergent compositions, and in particular in automatic dishwashing compositions, for anti-corrosion benefits. For example, multivalent ions and especially zinc, bismuth and/or manganese ions have been included for their ability to inhibit such corrosion. Organic and inorganic redox-active substances which are known as suitable for use as silver/copper corrosion inhibitors are mentioned in WO 94/26860 and WO 94/26859. Suitable inorganic redox-active substances are, for example, metal salts and/or metal complexes chosen from the group consisting of zinc, bismuth, manganese, titanium, zirconium, hafnium, vanadium, cobalt and cerium salts and/or complexes, the metals being in one of the oxidation states II, III, IV, V or VI. Particularly suitable metal salts and/or metal complexes are chosen from the group consisting of $MnSO_4$, Mn(II) citrate, Mn(II) stearate, Mn(II) acetylacetonate, Mn(II) [1-hydroxyethane-1,1-diphosphonate], $V_2O_5$, $V_2O_4$, $VO_2$, $TiOSO_4$, $K_2TiF_6$, $K_2ZrF_6$, $CoSO_4$, $Co(NO_3)_2$, Zinc acetate, zinc sulphate and $Ce(NO_3)_3$. Any suitable source of multivalent ions may be used, with the source preferably being chosen from sulphates, carbonates, acetates, gluconates and metal-protein compounds. Zinc salts are specially preferred corrosion inhibitors.

Other glassware protection agents are cationic polymers. A particularly preferred polymer is PEI, or polyethyleneimine.

Preferred silver/copper anti-corrosion agents are benzotriazole (BTA) or bis-benzotriazole and substituted derivatives thereof. Other suitable agents are organic and/or inorganic redox-active substances and paraffin oil. Benzotriazole derivatives are those compounds in which the available substitution sites on the aromatic ring are partially or completely substituted. Suitable substituents are linear or branch-chain $C_{1-20}$ alkyl groups and hydroxyl, thio, phenyl or halogen such as fluorine, chlorine, bromine and iodine. A preferred substituted benzotriazole is tolyltriazole.

Polymers intended to improve the cleaning performance of the shaped bodies or detergent compositions may also be included therein.

For example sulphonated polymers may be used. Preferred examples include copolymers of $CH_2=CR^1-CR^2R^3-O-C_4H_3R^4-SO_3X$ wherein $R^1$, $R^2$, $R^3$, $R^4$ are independently 1 to 6 carbon alkyl or hydrogen, and X is hydrogen or alkali with any suitable other monomer units including modified acrylic, fumaric, maleic, itaconic, aconitic, mesaconic, citraconic and methylene-malonic acid or their salts, maleic anhydride, acrylamide, alkylene, vinylmethyl ether, styrene and any mixtures thereof. Other suitable sulfonated monomers for incorporation in sulfonated (co)polymers are 2-acrylamido-2-methyl-1-propanesulphonic acid, 2-methacrylamido-2-methyl-1-propanesulphonic acid, 3-methacrylamido-2-hydroxy-propanesulphonic acid, allysulphonic acid, methallysulphonic acid, 2-hydroxy-3-(2-propenyloxy)propanesulphonic acid, 2-methyl-2-propenen-1-sulphonic acid, styrenesulphonic acid, vinylsulphonic acid, 3-sulphopropyl acrylate, 3-sulphopropylmethacrylate, sulphomethylacrylamide, sulphomethylmethacrylamide and water soluble salts thereof.

Suitable sulphonated polymers are also described in U.S. Pat. No. 5,308,532 and in WO 2005/090541.

Suitable foam control agents are all those conventionally used in this field, such as, for example, silicones and their derivatives and paraffin oil.

The inventors have found that it is not necessary to include protease or amylase in the compositions. Preferably, the first and/or second compositions contains substantially no protease/amylase, preferably substantially no enzymes. In an embodiment they contain no more than 0.1 wt % enzymes, preferably no more than 0.01 wt % enzymes, preferably no more than 0.001 wt % enzymes, preferably no more than 0.0001 wt % enzymes, preferably no more than trace amounts of enzymes, preferably no enzymes.

Preferred embodiments of temperature, duration etc. are set out in the claims.

It is possible to use a rinse step in between the first and second steps, to rinse any remaining unreacted bleach or other ingredients away from the dishware. Bleach is known to inactivate enzymes, so this might be useful in the case where the second composition contains enzymes. However, in the preferable embodiments of the invention, enzymes are not used, and so it is not necessary to take measures to ensure the bleach does not carry over to the second step. In an embodiment, it is not necessary to remove wash water from the interior of the dishwasher and add fresh water for the second step.

The optional third and/or fourth steps may be carried out using deionised water. This is advantageous over even softened water as there are no ionic species present in the wash water that can deposit over the cleaned tableware. This leads to a reduction in filming and spotting. Deionised water during the rinse step(s) is therefore highly preferred.

The third composition may comprise one or more surfactants. The surfactant may comprise a nonionic, anionic, cationic, amphoteric or zwitterionic surface active agents or suitable mixtures thereof may be used. Many such suitable surfactants are described in Kirk Othmer's Encyclopedia of Chemical Technology, 3rd Ed., Vol. 22, pp. 360-379, "Surfactants and Detersive Systems", incorporated by reference herein. In general, bleach-stable surfactants are preferred according to the present invention.

Non-ionic surfactants are especially preferred according to the present invention. A preferred class of nonionic surfactants is ethoxylated non-ionic surfactants prepared by the reaction of a monohydroxy alkanol with 6 to 20 carbon atoms. Preferably the surfactants have at least 12 moles, particularly preferred at least 16 moles, and still more preferred at least 20 moles, such as at least 25 moles of ethylene oxide per mole of alcohol.

Particularly preferred non-ionic surfactants are the non-ionics from a linear chain fatty alcohol with 16-20 carbon atoms and at least 12 moles, particularly preferred at least 16 and still more preferred at least 20 moles, of ethylene oxide per mole of alcohol.

According to one embodiment of the invention, the non-ionic surfactants additionally may comprise propylene oxide units in the molecule. Preferably these PO units constitute up to 25% by weight, preferably up to 20% by weight and still more preferably up to 15% by weight of the overall molecular weight of the non-ionic surfactant.

Surfactants which are ethoxylated mono-hydroxy alkanols, which additionally comprises polyoxyethylene-polyoxypropylene block copolymer units may be used. The alcohol portion of such surfactants constitutes more than 30%, preferably more than 50%, more preferably more than 70% by weight of the overall molecular weight of the non-ionic surfactant.

Another class of suitable nonionic surfactants includes reverse block copolymers of polyoxyethylene and polyoxypropylene and block copolymers of polyoxyethylene and polyoxypropylene initiated with trimethylolpropane.

Another preferred class of nonionic surfactant can be described by the formula:

R$^1$O[CH$_2$CH(CH$_3$)O]x[CH$_2$CH$_2$O]y[CH$_2$CH(OH)R$^2$]

where R$^1$ represents a linear or branched chain aliphatic hydrocarbon group with 4-18 carbon atoms or mixtures thereof, R$^2$ represents a linear or branched chain aliphatic hydrocarbon rest with 2-26 carbon atoms or mixtures thereof, x is a value between 0.5 and 1.5 and y is a value of at least 15.

Another group of preferred nonionic surfactants are the end-capped polyoxyalkylated nonionics of formula:

R$^1$O[CH$_2$CH(R$^3$)O]x[CH$_2$]kCH(OH)[CH$_2$]jOR$^2$ where R$^1$ and R$^2$ represent linear or branched chain, saturated or unsaturated, aliphatic or aromatic hydrocarbon groups with 1-30 carbon atoms, R$^3$ represents a hydrogen atom or a methyl, ethyl, n-propyl, iso-propyl, n-butyl, 2-butyl or 2-methyl-2-butyl group, x is a value between 1 and 30 and, k and j are values between 1 and 12, preferably between 1 and 5. When the value of x is >2 each R$^3$ in the formula above can be different. R$^1$ and R$^2$ are preferably linear or branched chain, saturated or unsaturated, aliphatic or aromatic hydrocarbon groups with 6-22 carbon atoms, where group with 8 to 18 carbon atoms are particularly preferred. For the group R$^3$H, methyl or ethyl is particularly preferred. Particularly preferred values for x are comprised between 1 and 20, preferably between 6 and 15.

As described above, in case x>2, each R$^3$ in the formula can be different. For instance, when x=3, the group R$^3$ could be chosen to build ethylene oxide (R$^3$=H) or propylene oxide (R$^3$=methyl) units which can be used in every single order for instance (PO)(EO)(EO), (EO)(PO)(EO), (EO)(EO)(PO), (EO)(EO)(EO), (PO)(EO)(PO), (PO)(PO)(EO) and (PO)(PO)(PO). The value 3 for x is only an example and bigger values can be chosen whereby a higher number of variations of (EO) or (PO) units would arise.

Particularly preferred end-capped polyoxyalkylated alcohols of the above formula are those where k=1 and j=1 originating molecules of simplified formula:

R$^1$O[CH$_2$CH(R$^3$)O]xCH$_2$CH(OH)CH$_2$OR$^2$

The use of mixtures of different nonionic surfactants is suitable in the context of the present invention for instance mixtures of alkoxylated alcohols and hydroxy group containing alkoxylated alcohols.

Other suitable surfactants are disclosed in WO 95/01416, to the contents of which express reference is hereby made.

The third composition may comprise further optional ingredients. In an embodiment the third treatment composition has a source of acidity. The source of acidity may be an organic carboxylic acid. A preferred example is citric acid.

The compositions used herein may comprise a source of acidity or a source of alkalinity, to obtain the desired pH. Preferred silicates are sodium silicates such as sodium disilicate, sodium metasilicate and crystalline phyllosilicates. A source of acidity may suitably be any suitable acidic compound for example a polycarboxylic acid. For example a source of alkalinity may be a carbonate or bicarbonate (such as the alkali metal or alkaline earth metal salts). A source of alkalinity may suitably be any suitable basic compound for example any salt of a strong base and a weak acid. When an alkaline composition is desired silicates are amongst the suitable sources of alkalinity.

Herein is described an automatic dishwasher designed to carry out the method of the first aspect of the invention.

The automatic dishwasher of the present invention will have the ability to dose at least two different compositions at different time points during the wash cycle. It is preferable that the machine is capable of independently dosing three or more compositions.

The dishwasher may have any suitable adaptation to allow it to deliver the first composition as a mist and the second composition as a jet. Devices suitable for producing a fine mist include but are not limited to ultrasonic or piezo actuators, heating elements, compositions including a propellant, cavitation, high shear stress pumps or nozzles configured accordingly. In addition, there may be multiple mist generation devices within the machine.

In certain embodiments the mist is delivered by an atomizer. The jet may be delivered through a nozzle. Alternatively the dishwasher may comprise a nozzle that is adjustable between a first configuration for delivering the first composition as a mist, and a second configuration for delivering the second composition as a jet.

It is preferable that the machine has multiple wash functions with different temperature settings, cycle lengths and water consumption and drying options. It is preferred that the machine provides both long wash cycles for highly soiled tableware and short wash cycles. At least one of the short wash cycles will use a method according to the invention, thus the consumer can choose when to use the short cycle and when to use a longer cycle, according to their individual requirements.

Preferably the machine has a method of preparing deionised water. This may be by reverse osmosis.

in addition to having simple programs the automatic machine of the present invention may also have an automatic dosing (or metered dosing) control ability. This would allow the machine, based on sensory inputs, to increase or decrease the amount of chemicals added to each stage of the wash. The sensors may also be able to lengthen or shorten sequence steps, based on conditions. Sensors that may be used include pH, turbidity, temperature, humidity, conductivity etc. The machine may require data processing power to achieve this.

Drying could be monitored by a humidity sensor such that drying (if required) would only be carried out for the duration that it was needed and no longer.

It is preferably that the machine will have connectivity to other devices. This may take the form of wi-fi, 3G mobile data, Bluetooth, etc. This may allow the machine to be monitored and/or controlled remotely. Preferably this also allows the machine to connect with the internet.

The invention is further described with reference to the following non-limiting Examples. Further examples within the scope of the invention will be apparent to the person skilled in the art.

EXAMPLES

Example 1—IKW Tests on Tough Soils

To demonstrate the present invention, a single-tank domestic dishwasher (Miele G661) was modified with an additional interface allowing the inventors to control the spray arm rotation speed, water temperature and water drainage. The holes of the spray arm of the upper rack were also modified to allow reduced water usage during certain parts of the cycle.

According to the (2005) IKW method, cups were stained with tea and glass beakers were soiled with burnt-on milk. These were loaded into the dishwasher, along with stainless steel knives and other glasses that had been prepared according to the IKW method for assessing rinse performance.

The following compositions were prepared:

First composition:—the following ingredients were dissolved/dispersed in 0.5 litres of 9° dH water: 2.04 g sodium percarbonate, 3.14 g sodium silicate/MGDA co-granule, 0.70 g TAED, 0.84 g HEDP, 6 mg manganese-based bleach catalyst.

Second composition—the following ingredients were dissolved/dispersed in 2.5 litres of 9° dH water: 1.57 g sodium silicate/MGDA co-granule, 0.42 g HEDP, 83 mg Plurafac® LF 223.

Third composition—Plurafac® LF 300 was dissolved/dispersed in 0.5 litres deionized water.

Fourth composition—0.5 litres deionized water.

The first composition was pre-heated to 50° C. and applied to the dishware using a trigger spray bottle to simulate the creation of mist by the dishwasher in the first step. After 2 minutes, without draining the residual composition from the tank, the second composition was added at 50° C. to the sump of the dishwasher tank and the dishwasher was run to circulate the composition through the normal spray arm mechanism of the machine, thereby delivering the composition as a jet. This second step was carried out for 10 minutes and then the wash water was drained from the tank. The third composition (pre-heated to 65° C.) was applied to the dishware using the same type of trigger spray bottle as used in the first step. After 2 minutes, the fourth composition (pre-heated to 65° C.) was applied to the dishware using the same type of trigger spray bottle as used in the first step. This was allowed to act for 2 minutes, after which the wash water was drained from the tank. No active drying step was used; the door of the machine was simply opened to allow water vapour to escape and the wares were allowed to dry naturally for 30 minutes before being assessed.

Comparative Example 1

As a reference, the test of Example 1 was repeated exactly, the only modification being the use of 9° dH water (with no added detergent ingredients) instead of each of the first to fourth compositions.

Comparative Example 2

Tea and milk-stained dishware was prepared in the same manner as in Example 1. These were placed inside a Miele G698 SC Plus dishwasher, and a traditional tablet comprising sodium percarbonate, sodium silicate, MGDA, TAED, HEDP, manganese-based bleach catalyst, non-ionic surfactant, protease and amylase, was inserted into the dispenser. The machine was run using the "Short 45° C." programme.

Assessment and Results—Cleaning Performance

At the end of the programmes, the cups and milk-stained glasses were assessed according to the IKW method using the cleaning scale of 1 to 10 (10 being the optimum cleaning).

|  | Example 1 | Comparative Example 1 (water only) | Comparative Example 2 (conventional "quick wash") |
| --- | --- | --- | --- |
| Average cleaning score: tea | 10 | 2.25 | 3 |
| Average cleaning score: burnt-on milk | 6.25 | 2.00 | 6.25 |

Burnt-on milk is a stubborn soil and the skilled person would expect to need protease in the detergent composition to be able to remove this. Surprisingly, these experiments show that this inventive method provides equivalent cleaning performance on this stain to the prior art "quick wash" cycle, despite using no enzymes at all and a significantly lower volume of water (4 litres in total compared to 13 litres). In addition, the inventive method provides exceptional bleach performance.

Assessment and Results—Rinse Performance

At the end of the programmes, the knives and glasses were assessed for spotting and filming performance, using the scale of 1 to 10 (10 being the optimum).

|  | Example 1 | Comparative Example 2 (conventional "quick wash") |
| --- | --- | --- |
| Average spotting - glasses | 6.3 | 1.8 |
| Average filming - glasses | 8.8 | n.d.* |
| Average spotting - knives | 7.2 | 3.3 |
| Average filming - knives | 9.5 | 8.8 |

*in this case the spotting was so bad that the filming score could not be evaluated.

It can be seen that a large improvement is achieved in the example of the invention, particularly on spotting.

Example 2

Testing was carried out on a series of lightly- and freshly-soiled dishes, simulating a consumer relevant light load. The dishes were washed using the embodiment of the inventive method set out in Example 1, and compared with an equivalent test in which only water was used. The dishes were examined for evidence of redeposition of soils at the end of the tests. These experiments revealed that using water alone with the same wash cycle profile as the invention is insufficient to avoid redeposition. In contrast, when using the specified detergents in the inventive method, redeposition was significantly reduced overall, and completely avoided for some soils.

The invention claimed is:

1. A method of automatic dishwashing in a dishwasher having a wash tank consisting of:
   delivering a first composition to dishware in the wash tank in the form of a mist, the first composition comprising a percarbonate and one or more ingredients selected from the group consisting of a percarbonate activator, a percarbonate catalyst, a builder, and an alkalizer, the first composition further being substantially protease-free and amylase-free, wherein a maximum temperature reached during this step is no more than 52° C., but at least 48° C., wherein the length of this step is no more than 2 minutes, but at least 1 minute, wherein the volume of wash water used in this step is no more than 0.7 liters;
   maintaining residual wash water from the first step in wash tank;
   subsequently delivering a second composition to the dishware in the wash tank in the form of a jet, the second composition being alkaline and comprising a builder and one or more ingredients selected from the group consisting of a co-builder and a surfactant, the second composition further being substantially protease-free, amylase-free, and bleach-free, wherein a maximum temperature reached during this step is no more than 52° C., but at least 48° C., wherein the length of this step is no more than 10 minutes, but at least 8 minutes, wherein the volume of wash water used in this step is no more than 2.7 liters;
   subsequently delivering a third composition comprising a non-ionic surfactant to the dishware in the wash tank in the form of a mist, wherein a maximum temperature reached during this step is no more than 68° C., but at least 62° C., wherein the volume of wash water used in this step is no more than 0.7 liters;
   subsequently delivering a fourth composition comprising deionized water but no active detergent ingredients to the dishware in the wash tank in the form of a mist, wherein a maximum temperature reached during this step is no more than 68° C., but at least 62° C., wherein the volume of wash water used in this step is no more than 0.7 liters; drying the dishware after the fourth step, and/or rinsing the dishware with rinse water before the first step, between the first and/or second steps; and
   wherein the total length of the method is no more than 20 minutes;
   wherein at least one of the first composition, the third composition, and the fourth composition is delivered with a mean particle size of 5 to 500 microns;
   wherein about 50% of the particles have a diameter of less than 60 microns; and
   wherein the first and second compositions are substantially amylase-free and protease-free.

2. A method of automatic dishwashing in a dishwasher having a wash tank consisting of:
   in a first step, delivering a first composition to dishware in the wash tank in the form of a mist;
   afterwards, in a second step, delivering a second composition to the dishware in the wash tank in the form of a jet;
   in a third step occurring after the second step, delivering a third composition to the dishware in the wash tank; and
   in a fourth step occurring after the third step, delivering a fourth composition to the dishware in the wash tank;
   maintaining residual wash water from the wash tank in between the first and second steps, drying the dishware after the fourth step, and/or rinsing the dishware with rinse water before the first step, and/or between the first and second steps; and
   wherein the third composition comprises a non-ionic surfactant;
   wherein the fourth composition comprises water but no active detergent ingredients; and
   wherein at least one of the third and fourth compositions are delivered to the dishware in the wash tank in the form of a mist,
   wherein the first and second compositions are different;
   wherein the first composition comprises a bleach;
   wherein the second composition is alkaline, bleach-free, and comprises a builder;
   wherein the first composition is delivered with a mean particle size of 5 to 500 microns;
   wherein about 50% of the particles have a diameter of less than 60 microns; and
   wherein the first and second compositions are substantially amylase-free and protease-free.

3. The method according to claim 2, wherein the first composition comprises one or more further ingredients selected from the group consisting of a bleach activator, a bleach catalyst, a builder, and an alkalizer.

4. The method according to claim 2, wherein the water comprises deionized water.

5. The method according to claim 2, wherein:
   the maximum temperature reached during one or both of the first and second steps is in a range of from 30° C. to 70° C.

6. The method according to claim 2, wherein:
   the length of the first step is in the range of from 30 seconds to 10 minutes;
   the length of the second step in the range of from 5 to 20 minutes; and
   the total length of the method is no more than 30 minutes.

7. The method according to claim 2, wherein:
   the volume of wash water used in the first step—is no more than 3 liters; and
   the volume of wash water used in the second step is no more than 5 liters.

8. An automatic dishwasher comprising a wash tank configured to carry out a method of automatic dishwashing, the method consisting of:
   in a first step, delivering a first composition to dishware in the wash tank in the form of a mist;
   afterwards, in a second step, delivering a second composition to the dishware in the wash tank in the form of a jet;
   in a third step occurring after the second step, delivering a third composition to the dishware in the wash tank;
   in a fourth step occurring after the second step, delivering a fourth composition to the dishware in the wash tank;
   maintaining residual wash water from the wash tank in between the first and second steps, drying the dishware after the fourth step, and/or rinsing the dishware with rinse water before the first step, and/or between the first and second steps; and
   wherein the third composition comprises a non-ionic surfactant;
   wherein the fourth composition comprises water but no active detergent ingredients; and wherein at least one of the third and fourth compositions are delivered to the dishware in the wash tank in the form of a mist, wherein the first and second compositions are different;

wherein the first composition comprises a bleach;

wherein the second composition is alkaline, bleach-free, and comprises a builder;

wherein the first composition is delivered with a mean particle size of 5 to 500 microns;

wherein about 50% of the particles have a diameter of less than 60 microns; and wherein the first and second compositions are substantially amylase-free and protease-free.

9. The automatic dishwasher according to claim 8 comprising a nozzle which is adjustable between a first configuration for delivering the mist and a second configuration for delivering the jet.

10. The automatic dishwasher according to claim 8 comprising:
 a spray arm for delivering the jet; and
 a separate delivery mechanism for delivering the mist.

11. The automatic dishwasher according to claim 10, wherein the delivery mechanism for delivering the mist comprises an atomizer.

* * * * *